United States Patent
Tokura et al.

(10) Patent No.: US 11,610,707 B2
(45) Date of Patent: Mar. 21, 2023

(54) CONTROLLER AND CONTROL METHOD FOR LINEAR SOLENOID VALVE

(71) Applicant: TOYOTA JIDOSHA KABUSHIKI KAISHA, Toyota (JP)

(72) Inventors: Takaaki Tokura, Nagoya (JP); Takeshi Yasuda, Kuwana (JP); Katsumi Kono, Toyota (JP); Tomohiro Kondo, Nissin (JP); Yasuhiro Tanaka, Nissin (JP); Masanori Matsubara, Toyota (JP); Tomoyuki Koike, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 310 days.

(21) Appl. No.: 17/150,294

(22) Filed: Jan. 15, 2021

(65) Prior Publication Data
US 2021/0304937 A1 Sep. 30, 2021

(30) Foreign Application Priority Data
Mar. 31, 2020 (JP) .............................. JP2020-063962

(51) Int. Cl.
*H01F 7/06* (2006.01)
*F16K 31/06* (2006.01)
*H01F 7/08* (2006.01)

(52) U.S. Cl.
CPC ......... *H01F 7/064* (2013.01); *F16K 31/0675* (2013.01); *H01F 7/081* (2013.01)

(58) Field of Classification Search
CPC ........ H01F 7/064; H01F 7/081; H01F 7/1844; H01F 2007/1866; H01F 2007/1888; F16K 31/0675

(Continued)

(56) References Cited

U.S. PATENT DOCUMENTS

2014/0254058 A1* 9/2014 Suzuki ................. H01H 47/325
361/153
2017/0062110 A1 3/2017 Matsumoto et al.

FOREIGN PATENT DOCUMENTS

EP  1 041 329 A2  10/2000
JP  2000-283325 A  10/2000
(Continued)

OTHER PUBLICATIONS

Machine Translation of Takei Japanese Patent Document JP 2019-36582 A Aug. 10, 2017 (Year: 2017).*

*Primary Examiner* — Kevin J Comber
(74) *Attorney, Agent, or Firm* — Oliff PLC

(57) ABSTRACT

A controller for a linear solenoid valve is configured to: calculate an average value of an exciting current within a period including a natural number multiple of the dither cycle as an average current value; execute a feedback control on a control value of the pulse width modulation signal such that a target value of the exciting current and the average current value match; and calculate a dither correction amount by multiplying a ratio between the control value of the pulse width modulation signal obtained by the feedback control and the average current value by a dither current value that is a current value corresponding to the dither correction amount and calculating the dither correction amount such that an increase in the exciting current due to the dither correction amount is canceled out by a decrease in the exciting current due to the dither correction amount within one dither cycle.

6 Claims, 4 Drawing Sheets

(58) Field of Classification Search
USPC .......................................................... 361/160
See application file for complete search history.

(56) References Cited

FOREIGN PATENT DOCUMENTS

| | | | |
|---|---|---|---|
| JP | 2014-197655 A | | 10/2014 |
| JP | 2019-036582 A | | 3/2019 |
| JP | 2019036582 A | * | 3/2019 |

* cited by examiner

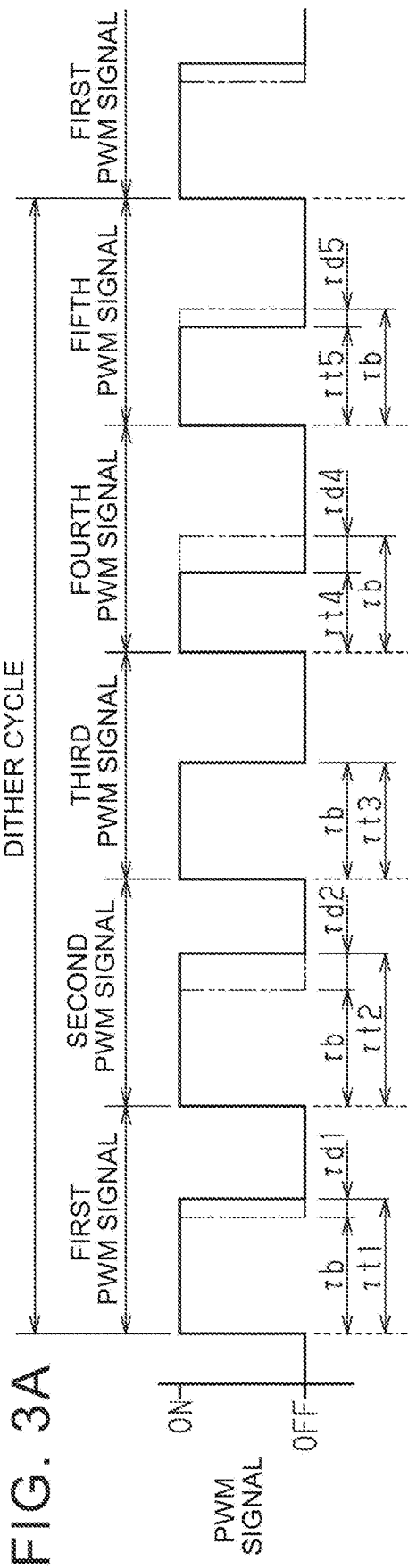
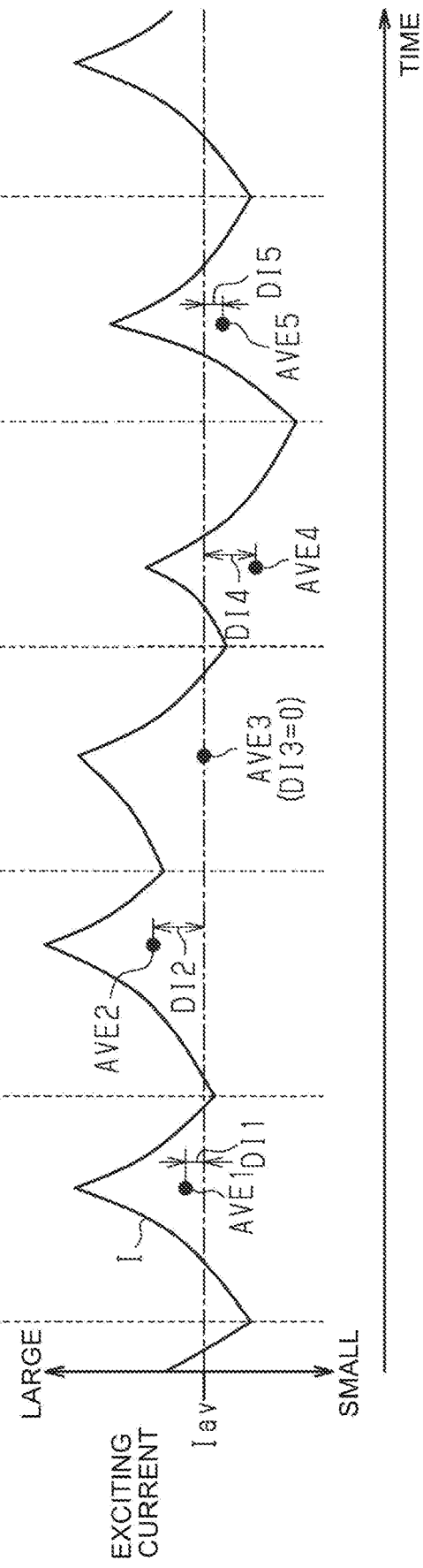

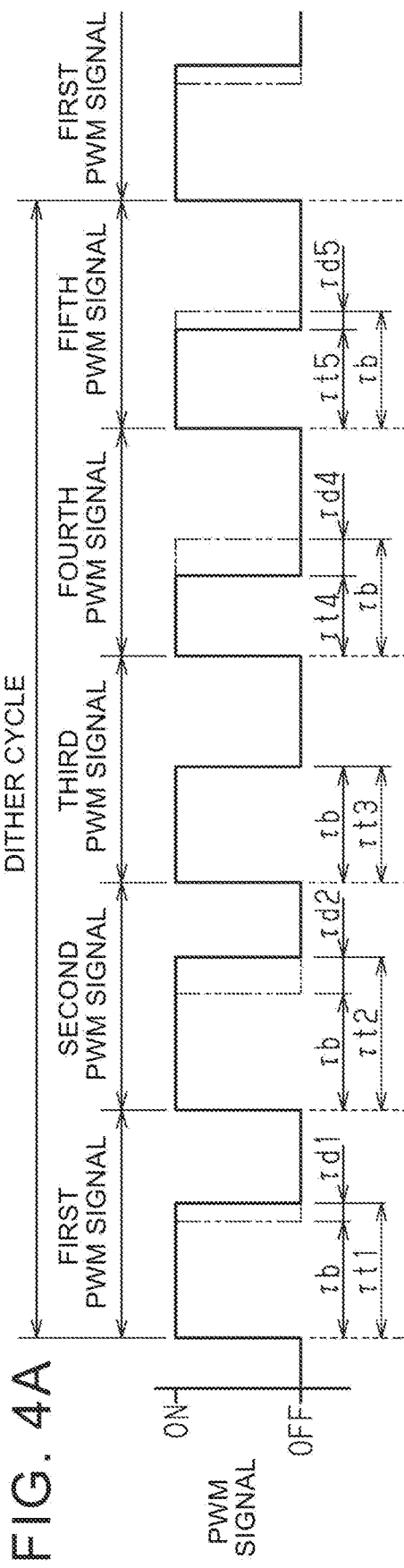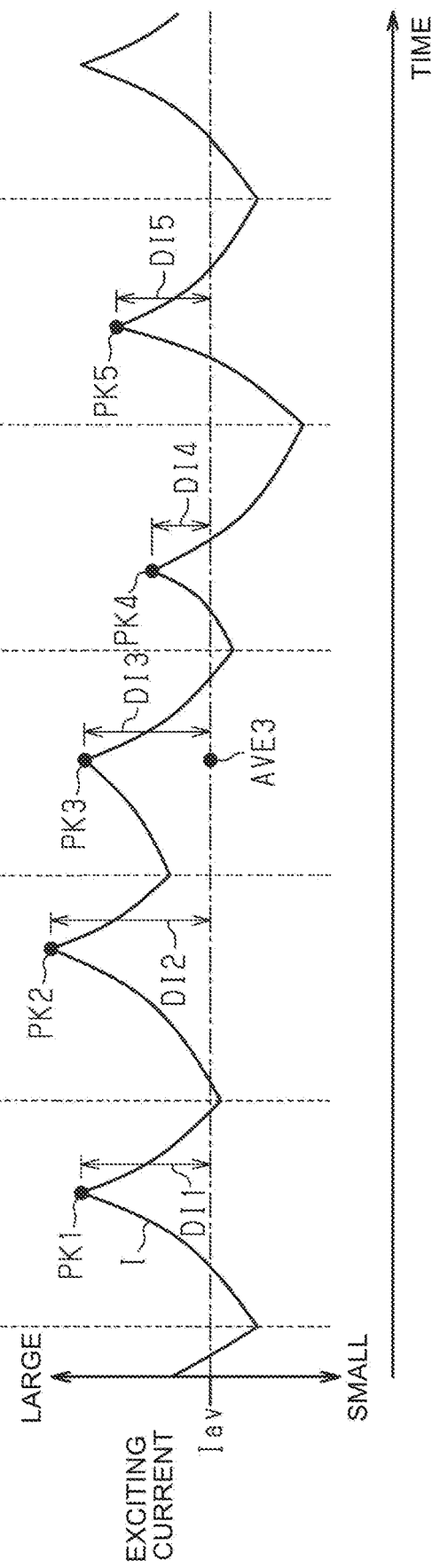

CONTROLLER AND CONTROL METHOD FOR LINEAR SOLENOID VALVE

CROSS-REFERENCE TO RELATED APPLICATIONS

This application claims priority to Japanese Patent Application No. 2020-063962 filed on Mar. 31, 2020, which is incorporated herein by reference in its entirety.

BACKGROUND

1. Technical Field

The present disclosure relates to a controller and a control method for a linear solenoid valve.

2. Description of Related Art

As described in Japanese Unexamined Patent Application Publication No. 2014-197655 (JP 2014-197655 A), there is a known controller that executes a pulse width modulation (PWM) control for controlling an exciting current of a linear solenoid valve and executes a dither control for reducing static friction between a sleeve and a spool by periodically increasing and decreasing the exciting current to vibrate the spool of the linear solenoid valve.

SUMMARY

The controller described in JP 2014-197655 A calculates the average value of the exciting current in one PWM cycle (PWM average current value Iave 1 mentioned in JP 2014-197655 A), and executes the dither control based on the calculated average current value.

Here, a noise component may be temporarily superimposed on the exciting current. If such a noise component is superimposed, the calculation accuracy of the average value of the exciting current in one PWM cycle is lowered, so the controllability of the exciting current by the dither control may deteriorate. Thus, the present disclosure provides a controller and a control method for a linear solenoid valve that improves the controllability of the exciting current by the dither control.

A first aspect of the present disclosure relates to a controller for a linear solenoid valve including an electronic control unit that executes each of the following processes. The electronic control unit is configured to execute a pulse width modulation control for controlling an exciting current of the linear solenoid valve and execute a dither control that periodically increases and decreases the exciting current through correction with a dither correction amount to vibrate a spool of the linear solenoid valve. When a pulse cycle of a pulse width modulation signal generated by the pulse width modulation control is defined as a pulse width modulation cycle and a vibration cycle of the spool due to the dither control is defined as a dither cycle, a plurality of the pulse width modulation cycles that are consecutive constitute one dither cycle, and the electronic control unit is configured to execute an averaging process of calculating an average value of the exciting current in a period including a natural number multiple of the dither cycle as an average current value. The electronic control unit is configured to execute a target current calculation process of calculating a target current value that is a target value of the exciting current. The electronic control unit is configured to execute a feedback process of executing a feedback control on a control value of the pulse width modulation signal such that the target current value and the average current value match. The electronic control unit is configured to execute a dither correction amount calculation process of calculating the dither correction amount that is different for each of the pulse width modulation cycles. The dither correction amount calculation process is a process of calculating the dither correction amount by multiplying a ratio between the control value of the pulse width modulation signal obtained by the feedback control and the average current value by a dither current value that is a current value corresponding to the dither correction amount and calculating the dither correction amount such that an increase in the exciting current due to the dither correction amount is canceled out by a decrease in the exciting current due to the dither correction amount within the one dither cycle.

A second aspect of the present disclosure relates to a control method for controlling a linear solenoid valve. The method includes: executing a pulse width modulation control for controlling an exciting current of the linear solenoid valve and executing a dither control that periodically increases and decreases the exciting current through correction with a dither correction amount to vibrate a spool of the linear solenoid valve; with a pulse cycle of a pulse width modulation signal generated by the pulse width modulation control being defined as a pulse width modulation cycle, a vibration cycle of the spool due to the dither control being defined as a dither cycle, and a plurality of the pulse width modulation cycles that are consecutive constituting one dither cycle, calculating an average value of the exciting current in a period including a natural number multiple of the dither cycle as an average current value; calculating a target current value that is a target value of the exciting current; executing a feedback control on a control value of the pulse width modulation signal such that the target current value and the average current value match; and calculating the dither correction amount by multiplying a ratio between the control value of the pulse width modulation signal obtained by the feedback control and the average current value by a dither current value that is a current value corresponding to the dither correction amount and calculating the dither correction amount that are different for each of the pulse width modulation cycles such that an increase in the exciting current due to the dither correction amount is canceled out by a decrease in the exciting current due to the dither correction amount within the one dither cycle.

According to the controller of the first aspect and the control method of the second aspect, the dither correction amount is calculated such that the increase in the exciting current due to the dither correction amount is canceled out by the decrease in the exciting current due to the dither correction amount within one dither cycle. Therefore, the average current value within one dither cycle is the same as the average current value when the dither control is not executed. Thus, the feedback control is executed with an influence of the dither control suppressed, which improves the controllability of the exciting current.

In the controller of the first aspect and the control method of the second aspect, the dither control is executed based on the average current value, and the average current value is the average value within a sampling period composed of a period including a natural number multiple of the dither cycle, that is, the plurality of pulse width modulation cycles. Therefore, even when a noise component is temporarily superimposed on the exciting current, the influence of such a noise component on the calculation accuracy of the average current value is small compared to the case where the average value of the exciting current in one pulse width modulation cycle is calculated. Thus, the controllability of the exciting current by dither control is improved.

Further, when the power supply voltage for driving the linear solenoid valve changes or the resistance value of the linear solenoid valve changes due to a temperature change, the magnitude of the exciting current corresponding to the control value of the pulse width modulation signal (for example, the duty cycle of the pulse width modulation signal with which the present average current value is obtained or the ON time of the pulse width modulation signal that changes depending on the duty cycle, and the like) differs. Therefore, the robustness of the control of the exciting current through the dither control may decrease. In this respect, in the above configurations, the dither correction amount is calculated by multiplying the ratio between the control value of the pulse width modulation signal obtained by the feedback control and the average current value by the dither current value that is a current value corresponding to the dither correction amount.

The ratio between the control value of the pulse width modulation signal obtained by the feedback control and the average current value is a value indicating the control value of the pulse width modulation signal per unit current value at the present power supply voltage and the resistance value of the linear solenoid valve. Thus, the value obtained by multiplying the ratio by the dither current value indicates the control value of the pulse width modulation signal required to obtain the dither current value for the dither control at the present power supply voltage or the resistance value of the linear solenoid valve, and the dither correction amount is calculated based on this value in the above configurations, which improves the robustness in the dither control.

In the controller of the first aspect, a value of the natural number multiple when the electronic control unit calculates the average current value used in the feedback process and a value of the natural number multiple when the electronic control unit calculates the average current value used in the dither correction amount calculation process may be the same.

With the controller having the above configuration, the sampling period of the average current value used for the feedback process and the sampling period of the average current value used for the dither correction amount calculation process are the same. This eliminates the need for calculating a plurality of average current values with different sampling periods when the dither control and the feedback control are executed. Thus, the calculation load of the controller can be reduced as compared with the case of calculating the average current values with different sampling periods.

Further, in the controller of the first aspect, the dither current value may be a difference between an average value of the exciting current and the average current value in each of the pulse width modulation cycles.

Further, in the controller of the first aspect, the dither current value may be a difference between a peak value of the exciting current and the average current value in each of the pulse width modulation cycles. With the controller having the above configuration, the peak value itself of the exciting current in each pulse width modulation cycle is controlled, so it is possible to restrain an excessive current from flowing through the linear solenoid valve during the execution of the dither control.

Further, in the controller having the above configuration, the peak value of the exciting current generated in order of passage of time may be undulated to increase or decrease in a sine wave manner within one dither cycle. With the controller having the above configuration, the peak value itself of the exciting current in each pulse width modulation cycle is controlled, so it is possible to restrain an excessive current from flowing through the linear solenoid valve during the execution of the dither control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3A is a time chart showing changes in a pulse width modulation (PWM) signal when a dither control is executed in the embodiment;

FIG. 3B is a time chart showing changes in an exciting current when the dither control is executed in the embodiment;

FIG. 4A is a time chart showing changes in the PWM signal when the dither control is executed in a modification of the embodiment; and FIG. 4B is a time chart showing changes in the exciting current when the dither control is executed in the modification of the embodiment.

DETAILED DESCRIPTION OF EMBODIMENTS

Figure 1:
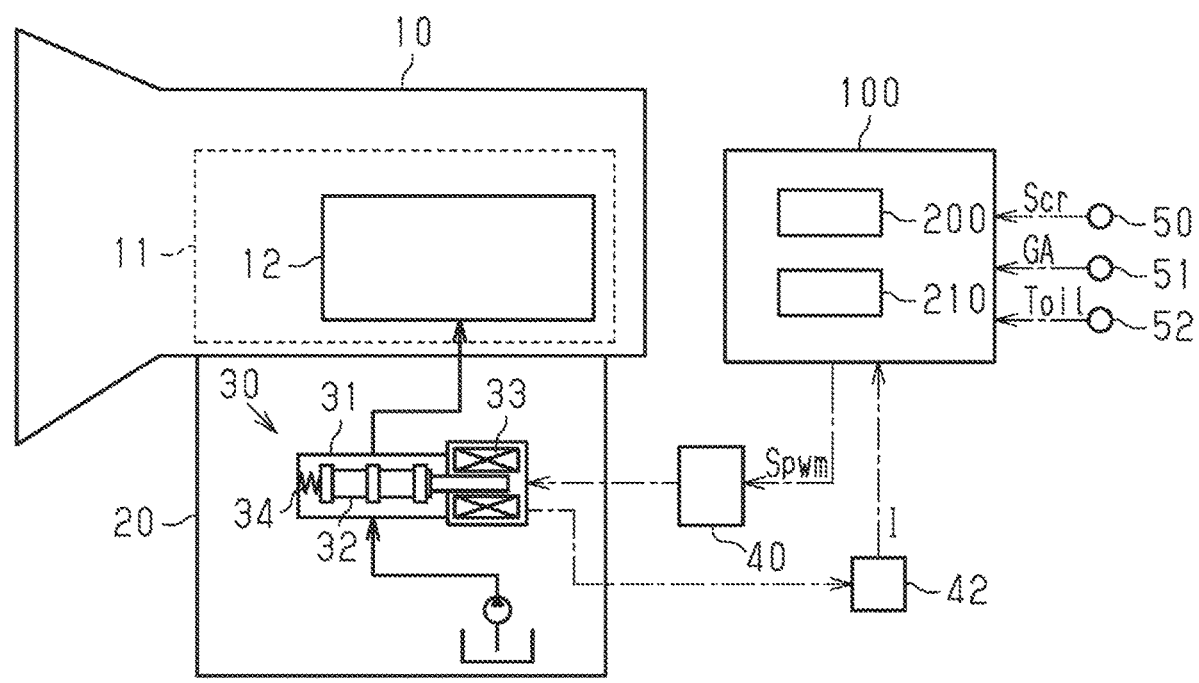
FIG. 1 is a schematic view showing a controller for a linear solenoid valve according to an embodiment.

Hereinafter, an embodiment will be described with reference to FIGS. 1, 2, 3A, and 3B, in which a controller for a linear solenoid valve is applied to an automatic transmission for a vehicle. As shown in FIG. 1, an automatic transmission 10 for a vehicle includes a speed change mechanism 11 including an engagement mechanism 12 such as clutches and brakes, a hydraulic circuit 20 having a linear solenoid valve 30 that adjusts a pressure of hydraulic oil, that is, a hydraulic pressure, supplied to the engagement mechanism 12 and the like.

The linear solenoid valve 30 includes a sleeve 31 having a plurality of ports, a spool 32 that switches the open/closed state of each port by moving inside the sleeve 31 in the axial direction, a spring 34 that urges the spool 32 in one direction along the axial direction, and an electromagnet 33 that moves the spool 32 in the axial direction against the urging force of the spring 34.

A drive circuit 40 is connected to the electromagnet 33, and an exciting current I of the electromagnet 33 changes in accordance with a signal input to the drive circuit 40. When the exciting current I of the electromagnet 33 changes, the position of the spool 32 in the sleeve 31 changes and the open/closed state of each port changes. Therefore, the hydraulic pressure supplied from the linear solenoid valve 30 to the engagement mechanism 12 changes. Further, a current detection circuit 42 for detecting the exciting current I of the electromagnet 33 is connected to the electromagnet 33.

The controller includes an electronic control unit 100. The electronic control unit 100 includes a central processing unit (hereinafter referred to as CPU) 200, a memory 210 in which control programs and data are stored, and the like. In the electronic control unit 100, the CPU 200 executes the programs stored in the memory 210 so that processes related to various controls are performed.

The electronic control unit 100 is connected to various sensors such as a crank angle sensor 50 that detects a crank angle Scr of a crankshaft of an internal combustion engine mounted on the vehicle, an airflow meter 51 that detects an intake air amount GA of the internal combustion engine, an oil temperature sensor 52 that detects an oil temperature Toil that is the temperature of the hydraulic oil supplied to the engagement mechanism 12, and a vehicle speed sensor that detects the vehicle speed of the vehicle. The electronic control unit 100 is also connected to the current detection circuit 42. The electronic control unit 100 executes various controls based on the signals output from the various sensors and the detection circuits.

As one of the controls, the electronic control unit 100 executes a drive control of the linear solenoid valve 30 by inputting a pulse width modulation (PWM) signal Spwm that is a pulse signal generated by a pulse width modulation control (hereinafter referred to as PWM control) to the drive circuit 40 to adjust the exciting current of the linear solenoid valve 30.

Further, in controlling the exciting current, the electronic control unit 100 periodically increases and decreases a duty cycle DR of the PWM signal Spwm to change the exciting current I of the electromagnet 33, thereby causing the spool 32 to vibrate slightly. Thus, the electronic control unit 100 executes the dither control for reducing the static friction between the sleeve 31 and the spool 32.

When the dither control is executed, the spool 32 vibrates slightly, but the vibration of the spool 32 is smoothed by the hydraulic system connected to the linear solenoid valve 30. Therefore, the pressure of the hydraulic oil supplied to the engagement mechanism 12 is restrained from significantly fluctuating due to the execution of the dither control.

Further, in the following, a pulse cycle of the PWM signal Spwm generated by the PWM control is referred to as a PWM cycle, and a vibration cycle of the spool 32 due to the dither control is referred to as a dither cycle. Further, in the present embodiment, five consecutive PWM cycles constitute one dither cycle.

Figure 2:
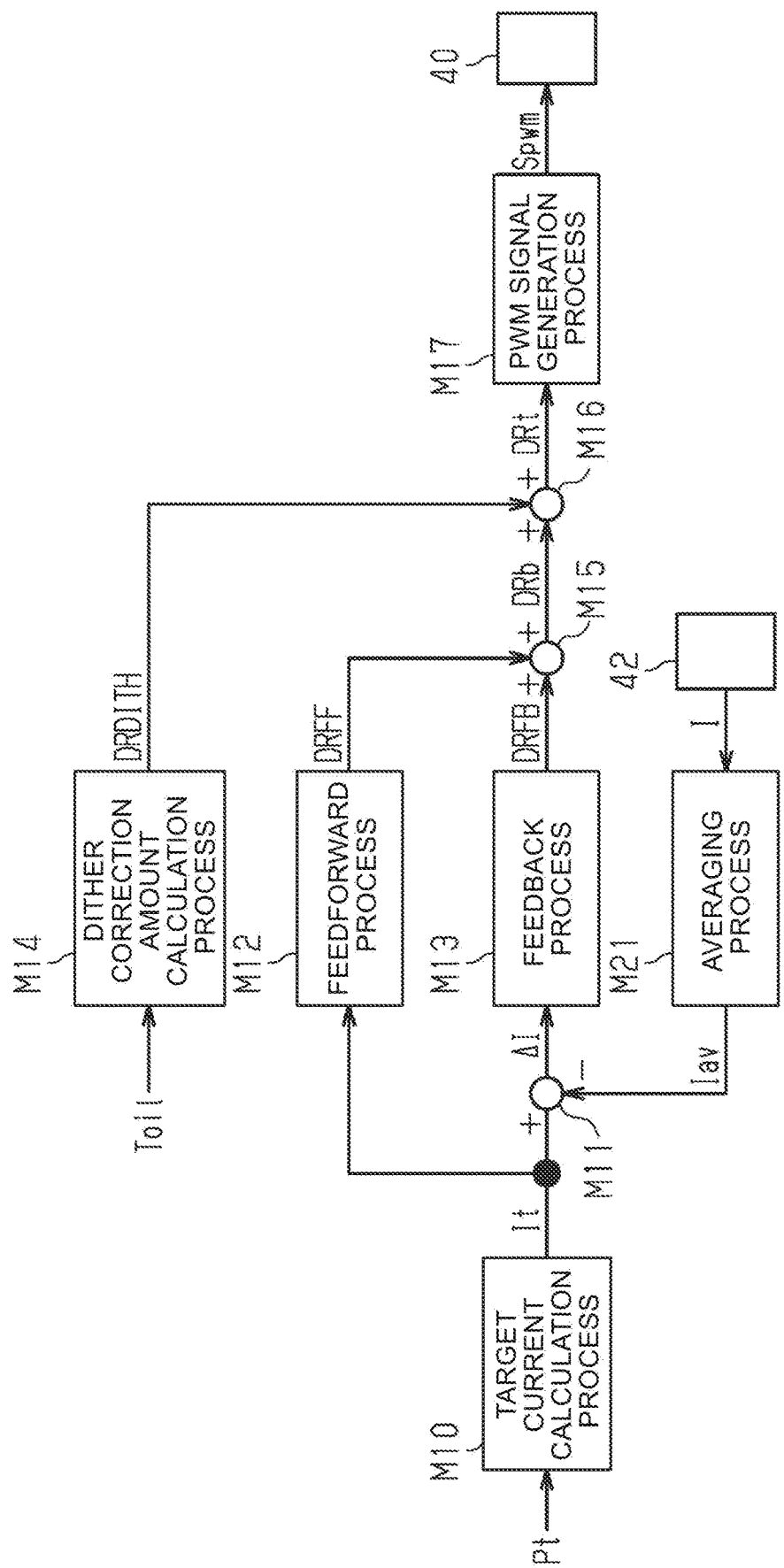
FIG. 2 is a block diagram showing processes executed by the controller of the embodiment.

FIG. 2 shows processes related to the drive control of the linear solenoid valve 30 executed by the electronic control unit 100. A target current calculation process M10 is a process of calculating a target current value It that is the target value of the exciting current I of the electromagnet 33 based on a target hydraulic pressure Pt. The target hydraulic pressure Pt is a value calculated by the electronic control unit 100 based on the operating state of the vehicle detected by various sensors, and is a target value of the hydraulic pressure supplied from the linear solenoid valve 30 to the engagement mechanism 12.

A feedforward process (FF process) M12 is a process of calculating a feedforward value DRFF based on the target current value It. The feedforward value DRFF is a duty cycle of the PWM signal Spwm, and is calculated such that the larger the target current value It, the larger the value of the feedforward value DRFF.

An averaging process M21 is a process of calculating an average current value Iav that is an average value of the exciting current I detected by the current detection circuit 42. The average current value Iav is the average value of the exciting current I in a period including a natural number multiple (one in the present embodiment) of the dither cycle.

A subtraction process M11 is a process of calculating a deviation ΔI between the target current value It and the average current value Iav. A feedback process (FB process) M13 is a process of calculating a feedback value DRFB by executing a feedback control based on the deviation ΔI. The feedback value DRFB is also the duty cycle of the PWM signal Spwm, and is a value for correcting the duty cycle of the PWM signal Spwm such that the deviation ΔI approaches "0", that is, the target current value It and the average current value Iav match. In the feedback process M13, the feedback value DRFB is calculated through a well-known feedback control such as a proportional-integral (PI) control and a proportional-integral-differential (PID) control.

A first addition process M15 is a process of calculating a basic duty cycle DRb. This basic duty cycle DRb is the sum of the feedforward value DRFF and the feedback value DRFB, and is a duty cycle calculated through feedback control such that the target current value It and the average current value Iav match. The basic duty cycle DRb and an ON time of the PWM signal (basic ON time τb described later) determined by the basic duty cycle DRb and the pulse frequency of the PWM signal Spwm can be regarded as control values of the PWM signal obtained by the feedback control.

A dither correction amount calculation process M14 calculates a dither correction amount DRDITH based on the oil temperature Toil. The dither correction amount DRDITH is a duty cycle for correcting the basic duty cycle DRb in order to execute the dither control described above, and a values is calculated that differs for each PWM cycle within one dither cycle. Further, the dither correction amount DRDITH is calculated such that as the oil temperature Toil decreases, the dither correction amount DRDITH increases, that is, the correction amount of the exciting current I by the dither correction amount DRDITH increases. This is for suppressing a decrease in the operation speed of the spool 32 due to a decrease in oil temperature because the spool 32 becomes more difficult to move as the oil temperature Toil decreases. A detailed calculation mode of the dither correction amount DRDITH will be described later.

A second addition process M16 is a process of calculating a target duty cycle DRt. The target duty cycle DRt is the sum of the basic duty cycle DRb and the dither correction amount DRDITH. A PWM signal generation process M17 is a process of generating the PWM signal Spwm with its ON time set based on the target duty cycle DRt and an appropriately set pulse frequency (for example, 1 kHz), and outputting the PWM signal Spwm to the drive circuit 40. The drive circuit 40 adjusts the exciting current I of the electromagnet 33 to a value corresponding to the target duty cycle DRt by turning on/off the electromagnet 33 in accordance with the input PWM signal Spwm.

FIGS. 3A and 3B show a calculation mode of the dither correction amount DRDITH by the dither correction amount calculation process M14. In the present embodiment, as described above, five consecutive PWM cycles constitute one dither cycle. In the following, the PWM cycles are designated as a first PWM cycle, a second PWM cycle, a third PWM cycle, a fourth PWM cycle, and a fifth PWM cycle in the order of passage of time.

In the present embodiment, the dither correction amount DRDITH is calculated as follows. That is, the dither correction amount DRDITH is calculated such that an increase in the exciting current I due to the dither correction amount DRDITH is canceled out by a decrease in the exciting current I due to the dither correction amount DRDITH within one dither cycle. Further, as indicated by Equation 1 and the like shown later, the dither correction amount DRDITH in each PWM cycle is calculated by multiplying a ratio between the control value of the PWM signal Spwm obtained by the feedback control and the average current value Iav by a dither current value that is a current value corresponding to the dither correction amount DRDITH.

Further, in the present embodiment, a difference between the average value of the exciting current I and the average current value Iav in each PWM cycle is a dither current value DI that is the current value corresponding to the dither correction amount DRDITH.

More specifically, when the average current value of the exciting current I in the first PWM cycle is "AVE1", the average current value of the exciting current I in the second PWM cycle is "AVE2", the average current value of the exciting current I in the third PWM cycle is "AVE3", the average current value of the exciting current I in the fourth PWM cycle is "AVE4", and the average current value of the exciting current I in the fifth PWM cycle is "AVE5", the sum of the values obtained by subtracting the average current value Iav from each of "AVE1", "AVE2", "AVE3", "AVE4", and "AVE5" is set to "0". Further, in the present embodiment, "AVE3" matches the average current value Iav, and the relationship of magnitude among the average current values of the exciting current I in the PWM cycles is represented as "AVE2">"AVE1">"AVE3">"AVE5">"AVE4". Thus, the average current value for each PWM cycle within one dither cycle undulates like a sine wave to increase and decrease, with "AVE3" set as a mean value of the amplitude.

Here, the ON time τt of the PWM signal in each PWM cycle is set by correcting the basic ON time τb in accordance with the basic duty cycle DRb calculated in the above mode, with a correction time τd in accordance with the dither correction amount DRDITH. For example, an ON time τt1 of the PWM signal in the first PWM cycle is set by correcting the basic ON time τb in accordance with the basic duty cycle DRb calculated in the above mode, with a first correction time τd1 in accordance with the dither correction amount DRDITH.

The basic ON time τb is the ON time required to match the target current value It and the average current value Iav, and the correction time τd is a time for executing the dither control by making the average current values in the PWM cycles different from each other.

Then, the dither correction amount DRDITH corresponding to the correction time τd in each PWM cycle is calculated based on Equation 1 and Equation 7 shown later.

[Equation 1]

$$\tau d(n) = \frac{\tau b}{Iav} \cdot DIb \cdot \left(\frac{k}{c}, k, 0, -k, -\frac{k}{c}\right) \quad (1)$$

where n=1 to 5,
τb: basic ON time,
Iav: average current value,
DIb: basic dither current value,
k: constant, and
c: constant The basic dither current value DIb in equation (1) is a basic value of the dither current value DI. The basic dither current value DIb is variably set so as to take a larger value as the oil temperature Toil decreases. By setting the basic dither current value DIb to be variable in accordance with the oil temperature Toil in this way, the dither correction amount DRDITH is variably set in accordance with the oil temperature Toil as described above.

The basic ON time τb is the control value of the PWM signal Spwm obtained by the feedback control as described above. The constant k is a value appropriately set through a test or the like conducted in advance, and as this value increases, the amplitude of the spool 32 by dither control increases. Further, the constant c is also a value appropriately set through a test or the like conducted in advance, and is set to "2" in the present embodiment, for example.

Based on the above equation (1), the first correction time τd1 in the first PWM cycle is calculated from Equation 2.

[Equation 2]

$$\tau d1 = \frac{\tau b}{Iav} \cdot DIb \cdot \left(\frac{k}{c}\right) \quad (2)$$

In equation (2), the value of "DIb×(k/c)" indicates a dither current value DI1 in the first PWM cycle, and corresponds to a value (positive value) obtained by subtracting the average current value Iav from the above "AVE1".

Further, based on the above equation (1), a second correction time τd2 in the second PWM cycle is calculated from Equation 3.

[Equation 3]

$$\tau d2 = \frac{\tau b}{Iav} \cdot DIb \cdot (k) \quad (3)$$

In equation (3), the value of "DIb×(k)" indicates a dither current value DI2 in the second PWM cycle, and corresponds to a value (positive value) obtained by subtracting the average current value Iav from the above "AVE2".

Further, based on the above equation (1), a third correction time τd3 in the third PWM cycle is calculated from Equation 4.

In equation (4), the value of "DIb×(0)" indicates a dither current value DI3 in the third PWM cycle, and corresponds to a value obtained by subtracting the average current value Iav from the above "AVE3", that is "0".

[Equation 4]

$$\tau d3 = \frac{\tau b}{Iav} \cdot DIb \cdot (0) \quad (4)$$

Further, based on the above equation (1), a fourth correction time τd4 in the fourth PWM cycle is calculated from Equation 5.

In equation (5), the value of "DIb×(-k)" indicates a dither current value DI4 in the fourth PWM cycle, and corresponds to a value (negative value) obtained by subtracting the average current value Iav from the above "AVE4".

[Equation 5]

$$\tau d4 = \frac{\tau b}{Iav} \cdot DIb \cdot (-k) \quad (5)$$

Further, based on the above equation (1), a fifth correction time τd5 in the fifth PWM cycle is calculated from Equation 6.

In equation (6), the value of "DIbx(−k/c)" indicates a dither current value DI5 in the fifth PWM cycle, and corresponds to a value (negative value) obtained by subtracting the average current value Iav from the above "AVE5".

[Equation 6]

$$\tau d5 = \frac{\tau b}{Iav} \cdot DIb \cdot \left(-\frac{k}{c}\right) \quad (6)$$

By substituting the correction times τd1 to τd5 thus calculated into Equation 7, the dither correction amount DRDITH in each PWM cycle is calculated.

[Equation 7]

$$DRDITH = \tau d \cdot H/10 \quad (7)$$

DRDIRH: dither correction amount DRDITH (%)
τd: correction time (ms)
H: pulse frequency (Hz) of PWM signal Next, operations and effects of the present embodiment will be described.

(1) The dither correction amount DRDITH is calculated such that an increase in the exciting current I due to the dither correction amount DRDITH is canceled out by a decrease in the exciting current I due to the dither correction amount DRDITH within one dither cycle. Therefore, the average current value Iav within one dither cycle is the same as the average value of the exciting current I when the dither control is not executed. Thus, even when the dither control is executed, the average current value Iav converges to the target current value It through the feedback control. Since the feedback control is executed with the influence of the dither control suppressed in this way, the controllability of the exciting current I is improved.

Here, in the present embodiment, the dither control is executed based on the average current value Iav, and the average current value Iav is the average value of the exciting current I within the sampling period composed of the period including the natural number multiple of the dither cycle, that is, the plurality of PWM cycles. Therefore, even when a noise component is temporarily superimposed on the exciting current I, the influence of such a noise component on the calculation accuracy of the average current value Iav is small compared to the case where the average value of the exciting current I in one PWM cycle is calculated. Thus, the controllability of the exciting current I by the dither control is improved.

(2) Further, when the power supply voltage for driving the linear solenoid valve 30 changes or the resistance value of the linear solenoid valve 30 changes due to a temperature change, the magnitude of the exciting current I corresponding to the control value of the PWM signal Spwm (for example, the duty cycle of the PWM signal Spwm with which the present average current value Iav is obtained, the ON time of the PWM signal Spwm that changes depending on the duty cycle, and the like) differs. Therefore, the robustness of the control of the exciting current I through the dither control may decrease.

In this regard, in the present embodiment, the dither correction amount DRDITH in each PWM cycle is calculated by multiplying the ratio between the basic ON time τb, which is the control value of the PWM signal Spwm obtained by the feedback control, and the average current value Iav, that is, the value of "τb/Iav" in the equation (1) by the dither current value DI, which is a current value corresponding to the dither correction amount, that is, each value of "Dib·(k/c, k, 0, −k, −k/c)" in the equation (1).

The ratio between the control value of the PWM signal Spwm obtained by the feedback control and the average current value Iav indicates the control value of the PWM signal Spwm per unit current value in the present power supply voltage and the resistance value of the linear solenoid valve 30. Thus, the value obtained by multiplying the ratio by the dither current value DI indicates the control value of the PWM signal Spwm required to obtain the dither current value DI for the dither control at the present power supply voltage or the resistance value of the linear solenoid valve 30, and the dither correction amount DRDITH is calculated based on this value, which improves the robustness in the dither control.

(3) In JP 2014-197655 A described above, in order to execute a dither control using a feedback control, the average value of the exciting current I in one PWM cycle and the average value of the exciting current I in one dither cycle are calculated, and thus, two average values with different sampling periods are obtained.

In the present embodiment, in contrast, the average current value Iav used in the feedback process M13 and the average current value Iav used in the above equation (1) in the dither correction amount calculation process M14 are the same value. That is, the value of the natural number multiple of the dither cycle for calculating the average current value used for the feedback process and the value of the natural number multiple of the dither cycle for calculating the average current value used for the dither correction amount calculation process are the same. As described above, the sampling period of the average current value used for the feedback process M13 and the sampling period of the average current value used for the dither correction amount calculation process M14 are the same. Therefore, the dither control using the feedback control is executed without the need for calculating a plurality of average current values with different sampling periods. Thus, in the present embodiment, the calculation load of the electronic control unit 100 can be reduced as compared with the technique of JP 2014-197655 A that calculates a plurality of average current values.

The present embodiment can be modified to be implemented as follows. The present embodiment and modifications to be described below may be carried out in combination within a technically consistent range.

In the above embodiment, as shown in FIGS. 3A and 3B, the difference between the average value of the exciting current I and the average current value Iav in each PWM cycle is defined as the dither current value DI for calculating the dither correction amount DRDITH. Besides, as shown in FIGS. 4A and 4B, a difference between a peak current value PK that is a peak value of the exciting current I and the average current value Iav in each PWM cycle may be defined as the dither current value DI for calculating the dither correction amount DRDITH.

As shown in FIGS. 4A and 4B, in this modification, for example, the peak current value of the exciting current I in the first PWM cycle is defined as "PK1", and a value obtained by subtracting the average current value Iav from "PK1" is defined as a first dither current value DI1. The peak current value of the exciting current I in the second PWM cycle is defined as "PK2", and a value obtained by subtracting the average current value Iav from "PK2" is defined as a second dither current value DI2. The peak current value of the exciting current I in the third PWM cycle is defined as "PK3", and a value obtained by subtracting the average current value Iav from "PK3" is defined as a third dither current value DI3. The peak current value of the exciting current I in the fourth PWM cycle is defined as "PK4", and a value obtained by subtracting the average current value Iav from "PK4" is defined as a fourth dither current value DI4. The peak current value of the exciting current I in the fifth PWM cycle is defined as "PK5", and a value obtained by subtracting the average current value Iav from "PK5" is defined as a fifth dither current value DI5.

Then, the third dither current value DI3 is set such that the average value AVE3 of the exciting current I in the third PWM cycle matches the average current value Iav. The first dither current value DI1, the second dither current value DI2, the fourth dither current value DI4, and the fifth dither current value DI5 are set such that the average value thereof matches the third dither current value DI3 and so as to have a relationship in magnitude of the peak current values PK of "PK2">"PK1">"PK3">"PK5">"PK4". Thereby, the dither correction amount DRDITH is calculated such that each peak current value PK is undulated to increase and decrease like a sine wave within one dither cycle and the increase in the exciting current I due to the dither correction amount DRDITH is canceled out by the decrease in the exciting current I due to the dither correction amount DRDITH within one dither cycle.

The dither correction amount DRDITH in this modification can be calculated based on Equation 8 and the above Equation 7.

[Equation 8]

$$\tau d(n) = \left\{ \left( 2 \cdot \frac{\tau b}{Iav} \cdot DIb \right) \cdot e^{\frac{R}{L}\tau b - 1} - 1 \right\} \cdot \frac{L}{R} \cdot \left( \frac{k}{c}, k, 0, -k, -\frac{k}{c} \right) \quad (8)$$

where n=1 to 5
τb: basic ON time,
Iav: average current value,
DIb: basic dither current value,
e: Napier's constant,
R: resistance value of coil of electromagnet 33,
L: inductance of coil of electromagnet 33,
k: constant, and
c: constant The basic dither current value DIb in the equation (8) is the basic value of the dither current value DI in this modification. The basic dither current value DIb may also be variably set so as to take a larger value as the oil temperature Toil decreases. Further, the basic ON time τb, the average current value Iav, the constant k, and the constant c in the equation (8) are the same as the values described in the above embodiment.

Then, by substituting each correction time τd1 to τd5 calculated from the equation (8) into the above equation (7), the dither correction amount DRDITH in each PWM cycle is calculated. According to the modification, since the peak value itself of the exciting current I in each PWM cycle is controlled, it is possible to restrain an excessive current from flowing through the linear solenoid valve 30 during the execution of the dither control.

The basic ON time τb of the above equation (1) or the above equation (8) may be replaced with the above basic duty cycle DRb. In this case, the value calculated from the equation (1) or the equation (8) is the duty cycle of the PWM signal Spwm rather than the ON time of the PWM signal Spwm. This eliminates the necessity of the conversion process based on the above equation (7) to convert the ON time of the PWM signal Spwm into the duty cycle.

Although the basic dither current value DIb is set to be variable in accordance with the oil temperature Toil, the basic dither current value DIb may be set as a fixed value. The value of the natural number multiple of the dither cycle for calculating the average current value Iav is set to "1", but the value of the natural number multiple can be changed as appropriate.

The value of the natural number multiple of the dither cycle for calculating the average current value used for the feedback process M13 and the value of the natural number multiple of the dither cycle for calculating the average current value used for the dither correction amount calculation process M14 are the same, but may be different. Even in this case, operations and effects other than the above (3) can be obtained.

The number of PWM cycles constituting one dither cycle is set to five, but the number of PWM cycles can be appropriately reduced.

The linear solenoid valve 30 is a valve provided in the hydraulic circuit 20 that supplies hydraulic pressure to the engagement mechanism 12 of the automatic transmission 10. However, the linear solenoid valve 30 may be a linear solenoid valve provided in the hydraulic circuit that supplies hydraulic pressure to other mechanisms.

The electronic control unit 100 is not limited to the one that includes the CPU 200 and the memory 210 and executes software processes. For example, the electronic control unit 100 may include a dedicated hardware circuit (for example, ASIC, etc.) that executes at least part of the software processes executed in the above embodiment. That is, the electronic control unit 100 only need to have any of the following configurations (a) to (c).

(a) A configuration including a processing device that executes all of the above processes according to a program and a program storage device such as a memory for storing the program (b) A configuration including a processing device that executes part of the above processes according to a program, a program storage device, and a dedicated hardware circuit that executes the remaining processes (c) A configuration including a dedicated hardware circuit that executes all of the above processes Here, the above configurations may have a plurality of software processing circuits including a processing device and a program storage device and a plurality of dedicated hardware circuits. That is, the processes only need to be executed by a processing circuit including at least one of one or more software processing circuits and one or more dedicated hardware circuits.

What is claimed is:

1. A controller for a linear solenoid valve, comprising:
an electronic control unit configured to execute a pulse width modulation control for controlling an exciting current of the linear solenoid valve and execute a dither control that periodically increases and decreases the exciting current through correction with a dither correction amount to vibrate a spool of the linear solenoid valve,
wherein when a pulse cycle of a pulse width modulation signal generated by the pulse width modulation control is defined as a pulse width modulation cycle and a vibration cycle of the spool due to the dither control is defined as a dither cycle, a plurality of the pulse width modulation cycles that are consecutive constitute one dither cycle, and the electronic control unit executes an averaging process of calculating an average value of the exciting current in a period including a natural number multiple of the dither cycle as an average current value;

wherein the electronic control unit executes a target current calculation process of calculating a target current value that is a target value of the exciting current;

wherein the electronic control unit executes a feedback process of executing a feedback control on a control value of the pulse width modulation signal such that the target current value and the average current value match; and wherein the electronic control unit executes a dither correction amount calculation process of calculating the dither correction amount that differs for each of the pulse width modulation cycles, the dither correction amount calculation process being a process of calculating the dither correction amount by multiplying a ratio between the control value of the pulse width modulation signal obtained by the feedback control and the average current value by a dither current value that is a current value corresponding to the dither correction amount and calculating the dither correction amount such that an increase in the exciting current due to the dither correction amount is canceled out by a decrease in the exciting current due to the dither correction amount within the one dither cycle.

2. The controller according to claim 1, wherein a value of the natural number multiple when the electronic control unit calculates the average current value used in the feedback process and a value of the natural number multiple when the electronic control unit calculates the average current value used in the dither correction amount calculation process are the same.

3. The controller according to claim 1, wherein the dither current value is a difference between an average value of the exciting current and the average current value in each of the pulse width modulation cycles.

4. The controller according to claim 1, wherein the dither current value is a difference between a peak value of the exciting current and the average current value in each of the pulse width modulation cycles.

5. The controller according to claim 4, wherein in the one dither cycle, the peak value of the exciting current generated in order of passage of time is undulated to increase and decrease in a sine wave manner.

6. A control method for controlling a linear solenoid valve, the method comprising:

executing a pulse width modulation control for controlling an exciting current of the linear solenoid valve and executing a dither control that periodically increases and decreases the exciting current through correction with a dither correction amount to vibrate a spool of the linear solenoid valve;

with a pulse cycle of a pulse width modulation signal generated by the pulse width modulation control being defined as a pulse width modulation cycle, a vibration cycle of the spool due to the dither control being defined as a dither cycle, and a plurality of the pulse width modulation cycles that are consecutive constituting one dither cycle, calculating an average value of the exciting current in a period including a natural number multiple of the dither cycle as an average current value;

calculating a target current value that is a target value of the exciting current;

executing a feedback control on a control value of the pulse width modulation signal such that the target current value and the average current value match; and calculating the dither correction amount by multiplying a ratio between the control value of the pulse width modulation signal obtained by the feedback control and the average current value by a dither current value that is a current value corresponding to the dither correction amount, and calculating the dither correction amount that are different for each of the pulse width modulation cycles such that an increase in the exciting current due to the dither correction amount is canceled out by a decrease in the exciting current due to the dither correction amount within the one dither cycle.

* * * * *